United States Patent
Voorhees et al.

(10) Patent No.: US 11,580,556 B1
(45) Date of Patent: Feb. 14, 2023

(54) SYSTEM AND METHOD FOR PREDICTING BEHAVIOR AND OUTCOMES

(71) Applicant: Nationwide Mutual Insurance Company, Columbus, OH (US)

(72) Inventors: Jeffrey L. Voorhees, Westerville, OH (US); Lily Liaw, Columbus, OH (US); Chengjun Hou, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 668 days.

(21) Appl. No.: 14/953,741

(22) Filed: Nov. 30, 2015

(51) Int. Cl.
*G06Q 30/00* (2012.01)
*G06Q 30/02* (2012.01)
(Continued)

(52) U.S. Cl.
CPC ....... *G06Q 30/016* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 5,822,410 | A * | 10/1998 | McCausland | H04M 15/00 379/114.01 |
| 6,301,471 | B1 * | 10/2001 | Dahm | H04M 15/00 379/114.1 |

(Continued)

OTHER PUBLICATIONS

Coussement, Kristof, and Dirk Van den Poel. "Improving customer attrition prediction by integrating emotions from client/company interaction emails and evaluating multiple classifiers." Expert Systems with Applications 36.3 (2009) (Year: 2009).*

(Continued)

*Primary Examiner* — Darlene Garcia-Guerra
(74) *Attorney, Agent, or Firm* — Morgan, Lewis & Bockius LLP (57) ABSTRACT

A system and method for predicting behavior and/or outcomes related to a consumer's experience with an organization are implemented. Household data for households that are associated with a customer service interaction as of a certain date is collected, the household data having been created over a first pre-determined period of time preceding the certain date. The household data is analyzed to identify positive household data sets and negative household data sets. The positive household data sets relate to customer service interactions which preceded a high level customer service interaction within a subsequent period of time and the negative household data sets relate to customer service transactions which did not precede a high level customer service interaction with the subsequent period of time. The positive household data sets and the negative household data sets are processed in the aggregate, using a trained support vector machine model, to determine cumulative differences between data contained within the positive household data sets and the negative household data sets. Each day, daily household data is collected. The daily household data describes individual customer service transactions occurring during a previous calendar day. The daily household data is processed using the model to determine whether each individual customer service transaction occurring during the previous calendar day is more similar to the positive household data sets or to the negative household data sets. The individual customer service transactions that are more similar to the positive household data sets are flagged for proactive intervention.

7 Claims, 3 Drawing Sheets

(51) Int. Cl.
*G06Q 30/016* (2023.01)
*G06Q 30/0201* (2023.01)
*G06Q 30/0202* (2023.01)

(56) References Cited

U.S. PATENT DOCUMENTS

| | | | | |
|---|---|---|---|---|
| 7,536,002 B1* | 5/2009 | Ma | .................. | H04M 3/493 |
| | | | | 379/266.02 |
| 8,417,715 B1* | 4/2013 | Bruckhaus | ......... | G06Q 30/0202 |
| | | | | 707/758 |
| 9,118,763 B1* | 8/2015 | Margulies | .......... | H04M 3/5191 |
| 9,386,152 B2* | 7/2016 | Riahi | .............. | H04M 3/5166 |
| 9,723,148 B2* | 8/2017 | Conley | ............. | H04M 3/5191 |
| 10,600,063 B2* | 3/2020 | Bracher | ............. | H04L 67/02 |
| 2002/0165755 A1* | 11/2002 | Kitts | .................. | G06Q 30/02 |
| | | | | 705/7.29 |
| 2003/0200135 A1* | 10/2003 | Wright | .................. | G06Q 30/02 |
| | | | | 705/7.29 |
| 2006/0265089 A1* | 11/2006 | Conway | ................. | G10L 15/22 |
| | | | | 700/94 |
| 2007/0192167 A1* | 8/2007 | Lei | ....................... | G06Q 20/227 |
| | | | | 705/7.31 |
| 2008/0154664 A1* | 6/2008 | Kuo | ................. | G06Q 10/0635 |
| | | | | 705/14.47 |
| 2008/0208677 A1* | 8/2008 | Mayr | .................... | G06Q 30/02 |
| | | | | 705/7.31 |
| 2009/0055270 A1* | 2/2009 | Magdon-Ismail | .... | G06F 16/957 |
| | | | | 705/14.27 |
| 2009/0276289 A1* | 11/2009 | Dickinson | ........... | G06Q 10/063 |
| | | | | 705/7.29 |
| 2009/0292583 A1* | 11/2009 | Eilam | .................... | G06Q 10/06 |
| | | | | 705/7.31 |
| 2009/0310774 A1* | 12/2009 | Hendricks | ........... | H04M 3/5183 |
| | | | | 379/265.13 |
| 2010/0138282 A1* | 6/2010 | Kannan | ............ | G06Q 10/06398 |
| | | | | 705/7.42 |
| 2010/0287011 A1* | 11/2010 | Muchkaev | ............ | A63F 13/216 |
| | | | | 379/93.13 |
| 2010/0332270 A1* | 12/2010 | Richter | .................. | G06Q 10/04 |
| | | | | 705/319 |
| 2010/0332287 A1* | 12/2010 | Gates | ................. | G06Q 30/0203 |
| | | | | 705/7.32 |
| 2011/0178831 A1* | 7/2011 | Ravichandran | ........ | G06Q 10/06 |
| | | | | 705/7.11 |
| 2011/0299676 A1* | 12/2011 | Hanson | .................. | G06Q 30/02 |
| | | | | 379/265.03 |
| 2011/0307257 A1* | 12/2011 | Pereg | ................... | G06Q 10/063 |
| | | | | 704/251 |
| 2011/0313900 A1* | 12/2011 | Falkenborg | .......... | G06Q 20/227 |
| | | | | 705/30 |
| 2012/0053990 A1* | 3/2012 | Pereg | ..................... | G06Q 40/02 |
| | | | | 705/7.31 |
| 2012/0130771 A1* | 5/2012 | Kannan | .............. | G06Q 30/0203 |
| | | | | 707/738 |
| 2013/0124258 A1* | 5/2013 | Jamal | ..................... | G06Q 30/02 |
| | | | | 705/7.29 |
| 2013/0124641 A1* | 5/2013 | Ryabchun | ........... | G06F 11/3495 |
| | | | | 709/206 |
| 2013/0173612 A1* | 7/2013 | Shah | ..................... | G06Q 50/01 |
| | | | | 707/731 |
| 2013/0279672 A1* | 10/2013 | Mohan | ............... | G06Q 10/0635 |
| | | | | 379/133 |
| 2014/0177544 A1* | 6/2014 | Kumar | .................. | H04L 47/828 |
| | | | | 370/329 |
| 2014/0249873 A1* | 9/2014 | Stephan | ............... | G06Q 10/063 |
| | | | | 705/7.11 |
| 2015/0254675 A1* | 9/2015 | Kannan | .................. | G06Q 30/02 |
| | | | | 705/304 |
| 2015/0256675 A1* | 9/2015 | Sri | ...................... | H04L 12/1827 |
| | | | | 379/265.09 |
| 2015/0281455 A1* | 10/2015 | Bushey | ............... | H04M 3/5166 |
| | | | | 379/265.13 |
| 2015/0310336 A1* | 10/2015 | Sotela | .................. | G06N 99/005 |
| | | | | 706/12 |
| 2015/0310446 A1* | 10/2015 | Tuchman | ............. | G06Q 30/016 |
| | | | | 705/304 |
| 2015/0371163 A1* | 12/2015 | Noh | .................... | G06Q 10/0635 |
| | | | | 705/7.28 |
| 2016/0005049 A1* | 1/2016 | Menezes | ............. | H04M 3/5175 |
| | | | | 705/7.28 |
| 2016/0012818 A1* | 1/2016 | Faizakof | .............. | G06F 16/285 |
| | | | | 704/245 |
| 2016/0055496 A1* | 2/2016 | Goldberg | ........... | G06Q 30/0202 |
| | | | | 705/7.31 |
| 2016/0078456 A1* | 3/2016 | Chakraborty | ...... | G06Q 30/0204 |
| | | | | 705/7.31 |
| 2016/0247165 A1* | 8/2016 | Ryabchun | .......... | G06Q 30/0201 |
| 2017/0034087 A1* | 2/2017 | Borenstein | ............. | H04L 51/08 |
| 2017/0094058 A1* | 3/2017 | Piaggio | ............... | H04M 3/5141 |
| 2017/0098227 A1* | 4/2017 | Cook | .................. | G06Q 30/0203 |

OTHER PUBLICATIONS

Coussement, Kristof, and Dirk Van den Poel. "Churn prediction in subscription services: An application of support vector machines while comparing two parameter-selection techniques." Expert systems with applications 34.1 (2008): 313-327 (Year: 2008).*

* cited by examiner

SYSTEM AND METHOD FOR PREDICTING BEHAVIOR AND OUTCOMES

FIELD OF THE INVENTION

The invention relates to models for predicting behavior and/or outcomes related to a consumer's experience with an organization.

BRIEF SUMMARY OF THE INVENTION

In accordance with embodiments of the present invention, a system and method for predicting behavior and/or outcomes related to a consumer's experience with an organization are implemented. Household data for households that are associated with a customer service interaction as of a certain date is collected, the household data having been created over a first pre-determined period of time preceding the certain date. The household data is analyzed to identify positive household data sets and negative household data sets. The positive household data sets relate to customer service interactions which preceded a high level customer service interaction within a subsequent period of time and the negative household data sets relate to customer service transactions which did not precede a high level customer service interaction with the subsequent period of time. The positive household data sets and the negative household data sets are processed in the aggregate, using a trained support vector machine model, to determine cumulative differences between data contained within the positive household data sets and the negative household data sets. Each day, daily household data is collected. The daily household data describes individual customer service transactions occurring during a previous calendar day. The daily household data is processed using the model to determine whether each individual customer service transaction occurring during the previous calendar day is more similar to the positive household data sets or to the negative household data sets. The individual customer service transactions that are more similar to the positive household data sets are flagged for proactive intervention.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE PREFERRED EMBODIMENTS

Customer case escalation involves repeated interactions between a customer and customer service representatives of an organization. Customers become frustrated due to increasing time and emotional investment during the resolution process. Expenditure of time and emotion decreases customer satisfaction and, possibly, customer tenure with an organization. In accordance with the systems and methods described herein, using a predictive model, customers are identified who are most likely to experience prolonged and lengthy escalation procedures when contacting an organization about an issue they are having with the products and/or services of the organization. Once identified, business and case details pertaining to these individuals can be directed to specialists within the organization for outbound intervention with the intention of circumventing the normal escalation process. This is valuable to an organization because most customers who endure the complete escalation/resolution process experience low satisfaction following the experience. Thus, use of the present invention saves customer time and frustration and can result in an increase in both satisfaction and retention among this set of vulnerable customers by facilitating early intervention by specialized representatives who can efficiently resolve complex issues. This results in reduced resolution time for an organization for complex cases.

The model incorporates business details that are unique to the customer (e.g., customer history, product details, and contact history, by way of example) and log notes collected during the calls to the customer service representatives by the customer. The model applies the data to classify and rank individuals based on their relative similarity between a novel individual and the characteristics of individuals who have behaved in a particular way and experienced a particular outcome, namely, moved through the escalation process and reached a higher level of customer service within an organization within a certain number of days of initial contact with a customer service representative. Such higher level of service within the organization is one that resolves serious complaints and problems, which has representatives that are trained to resolve complex issues on behalf of customers quickly (e.g., within 48 hours). Generally, a group within an organization that has one or more of these characteristics is referred to herein as the office of consumer advocacy (OCA), for ease of reference.

Machine learning is used to train a classification model (e.g., a linear support vector machine) using the organization's aggregated customer data. More particularly, the model relies on both aggregated data reflecting the organization's customers' behavior, as well as data that is unique to the consumer, to predict the behavior of the customer and related outcome (e.g., how likely is it that the customer will end up having his problem escalated to OCA and, if there is intervention before that occurs, what impact will that have on customer retention).

The invention solves the problem of identifying customers who are likely to experience prolonged escalation during their case resolution process and provides the opportunity to intervene early in the process for the purpose of remedying the problem at hand and creating a better consumer experience. Existing solutions use predefined business parameters and narrowly defined text analysis (e.g., key word searches) in an attempt to predict why a customer is calling, what the customer may purchase or what the customer's sentiment may be. However, such existing solutions do not employ a methodology that involves predicting future actions of customers based on aggregate, individual-level assessment of comprehensive business details, an individual's past interactions with an organization and the unstructured and qualitative aspects of those interactions.

The machine learning component of the invention is now described. In the exemplary embodiment, a linear support vector machine (SVM) is employed. Machine learning identifies patterns in customer characteristics. Using a classification model and text analytics, the approach predicts case escalation by uncovering patterns in case data, the text of customer service representative logs, and customer behavior. In accordance with the approach, past behaviors and characteristics of customers who have experienced escalation and OCA contact is examined. The patterns in these behaviors are modeled to predict who may need intervention. Individual elements were found to confer little predictive power; rather, an analysis of the combination of factors is necessary for effective employment of the model.

In one exemplary application, households that include customers of the organization with at least one OCA complaint during the last year are identified. A history of transactions between the organization and a member of each household is collected from the organization's database. Using this data, the classification model learns the features of transactions that are associated with OCA contact. For example, the variables considered in connection with the analysis may include:

(1) contact frequency—number of transactions, by category, by time period over a certain historical period (e.g., 9 months or a year); number of transactions in the last month; number of transactions in the last week;

(2) contact reason—current business and topic categories; number of past transactions in each category;

(3) log notes;

(4) contact target and source—who initiated/received the current contact; how many past transactions were initiated/received by the customer/customer service representative; and (5) content path—the paths through which the customer has contacted the company preceding the contact currently under consideration.

The machine learning component, thus, identifies both the quantitative and qualitative characteristics of those who have had OCA contact in the past. The quantitative characteristics are obtained from structured data (e.g., attributes of transactions that have occurred). The qualitative characteristics are obtained from unstructured data (e.g., textual data from log notes of customer service representatives). The unstructured data text analysis (e.g., analysis of call logs prepared by customer service representatives speaking with customers) enables access to the qualitative aspects of the customer experience. Unstructured text provides a rich source of data, including data describing the emotional state of the consumer; details about the consumer's problem, including who, when and why; and elements indicating the level of complexity of the problem. Word count is taken into account, as larger word-counts correlate with case complexity. Word usage is also taken into account, e.g., to identify terms used in notes of current and past transactions. Analysis of word usage may be accomplished using a document-term matrix. In accordance with the matrix, unique terms (e.g., unigrams or bigrams) that have been used more than a designated number of times in the past (e.g., 5 times) in the log notes are identified. Such terms are quantified (i.e., is the term present in the log note (binary $\{0, 1\}$) and how many times). Word count data and word usage data can then be used by the model as sub-parts of a larger comprehensive relationship (i.e., is a given term present in a log note and, if so, how many times does the term occur in the log note, and in connection with what assortment and frequency of words). Model tuning and training is undertaken as part of the model development process to ensure accuracy and precision of modeling.

In the exemplary embodiment, the model uses over 2000 unique variables. Additionally, trigger mechanisms may be included in the model which alternatively allow or disallow individuals from consideration for model selection. For example, in order to be included in the consideration set, an individual would first have to initiate a transaction with customer service within certain categories (e.g. paying a bill will not result in inclusion in the model whereas calling to provide feedback will place an individual in model consideration). Alternately, having received outbound action (e.g., an outbound communication, such as a call from a member of the OCA, automated call, or email) within previous three days excludes an individual from model consideration.

The object of the process is to identify individuals in need of OCA intervention. Individuals who contact customer service and reach the OCA within five days are used as a proxy for modeling purposes. However, in reality, many people in need of OCA contact do not reach the OCA within five days. Some individuals quit before reaching the OCA (despite the fact that they would have benefitted from OCA contact) and many may reach the OCA more than five days after initial customer service contact. For this reason, when the model identifies a "positive" (i.e., someone who appears very similar to those who have previously reached the OCA within the five days) and this individual does not, in fact, reach the OCA within five days, this does not mean that the individual did not have the same OCA need as others that he or she resembles.

Once the model is trained, in an exemplary embodiment, all customers who called the organization recently (e.g., within the last day) are identified and data regarding such transactions are input into the model. In some embodiments, not all such transactions are considered by the model, as some may be filtered out based on, e.g., whether another unit within the organization (not OCA) is already proactively contacting the consumer. The model (trained on the data described previously regarding characteristics of customers who have had OCA contact in the past) then identifies particular customers, out of all the customers who called the organization recently (e.g., yesterday), that are likely to have another call with the organization about their problem. OCA may then determine which of these identified customers would benefit from intervention. Customers who are identified as likely to have OCA contact in the near future can be identified, and intervention employed.

Thus, the SVM learns the response variable class using labeled training data (i.e., for a given transaction, was there OCA contact within a certain amount of time (e.g., 5 days) following a transaction (binary: yes or no)). The predictor variables are transaction attributes for the structured data and textual data for the unstructured data. The SVM finds the boundary of largest separation between classes based on the predictor variable values.

In some embodiments, once an intervention is made, data describing feedback resulting from the intervention may be recorded. For example, it may be recorded whether the customer found the contact useful and was pleased with the contact. This allows for direct measurement of customer impact (i.e., does intervention improve retention) and provides parameters for model refinement (i.e., was intervention valuable and was the customer reception positive).

The output of the model may be displayed in a manner that allows the end user to interact with the data.

Figure 1:
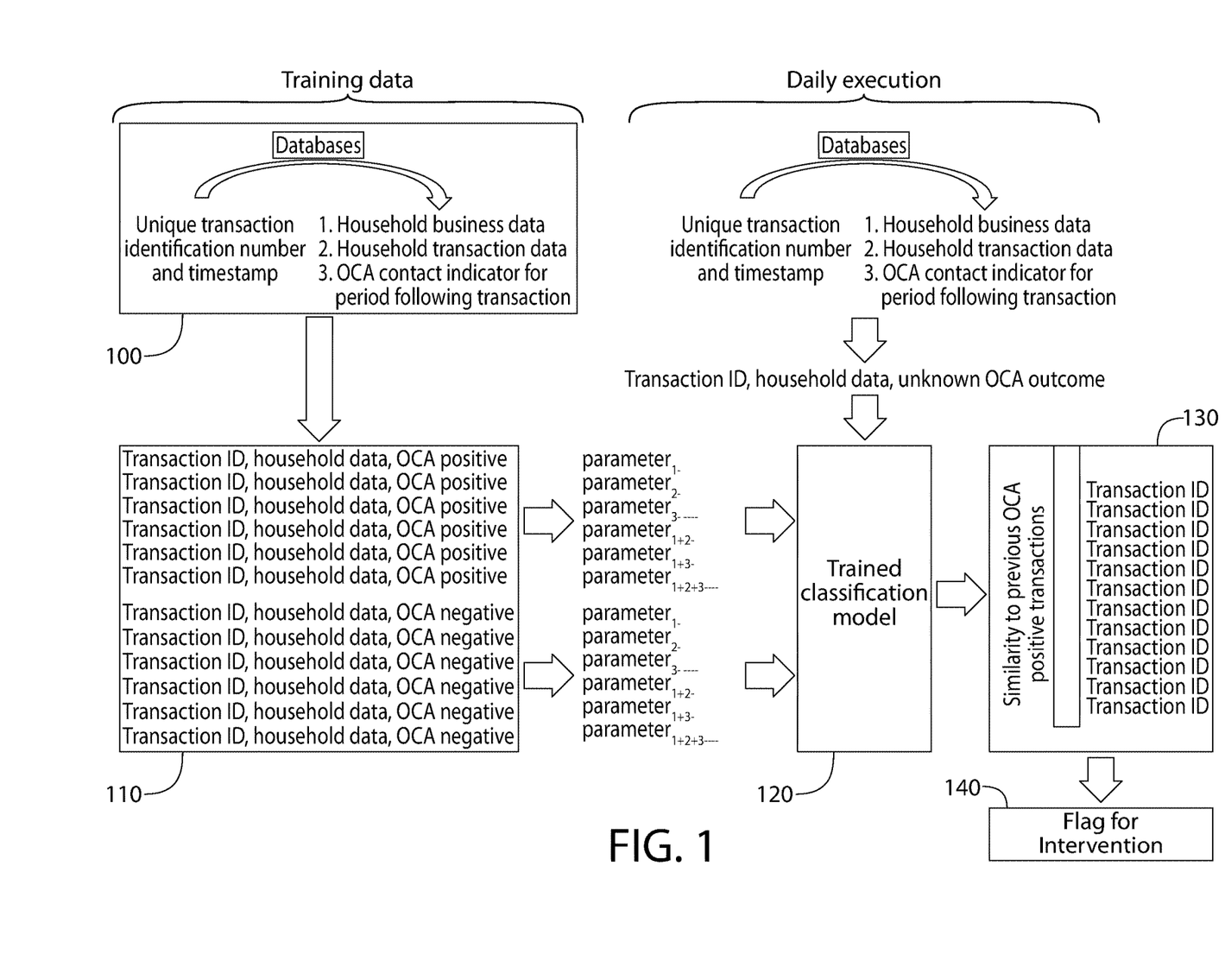
FIG. 1 illustrates an exemplary method of the present invention.

FIG. 1 is illustrative of one embodiment of the inventive method.

In step 100, for all households with a customer service interaction as of a certain date, all available data (structured and/or unstructured data) created over a pre-determined period of time (e.g., the 10 months preceding a given customer service interaction) is collected for such households. Thus, in a simple example for ease of exposition, 10 households have had a customer service interaction as of Oct. 1, 2015. All data associated with those 10 households, going back to Jan. 1, 2015, is collected, including data regarding transactions carried out by or with such households and interactions with such households.

In step 110, the data collected in step 100 (i.e., the data for the 10 households) is analyzed to identify household data relating to customer service interactions (identified using a transaction ID) which preceded an OCA interaction within the subsequent five days (referred to herein as "OCA positive") and, separately, household data relating to customer service transactions (identified with a transaction ID) which did not precede OCA interaction in the five subsequent days (referred to herein as "OCS negative").

In step 120, the trained model processes, in the aggregate, the information contained within the two respective data sets. In particular, each parameter is considered individually as well as in relation to other available parameters within respective OCA positive or OCA negative data sets. For example, the model may give unique weights to customer tenure (e.g., one year versus ten years), current product ownership combination (e.g., auto alone versus auto, home and life insurance) and the combination of tenure and product ownership (e.g., one year of auto insurance ownership versus ten years of continuous auto, home and life insurance ownership). These three weights would be independently factored into the output of the model. This permits cumulative differences between respective OCA positive or OCA negative data sets to guide the classification of household data relating to novel customer service transactions. For example, it might be observed that customers of shorter tenure are more likely to reach the OCA than those of longer tenure and customers with more products are more likely to reach the OCA than customers with fewer products, but customers of short tenure with many products are the most likely to reach the OCA. In this way, by considering the parameters of tenure and product ownership both independently and in relation to one another, the model is able to make a projection of which parties are most like those who have reached the OCA.

In step 130, household data relating to individual customer service transactions within a time period, e.g., a given calendar day, are aggregated and analyzed the following day. Data sets related to each of the previous day's customer service transactions are then judged by the model to be more similar to OCA positive transactions or OCA negative transactions. In some embodiments, not all transactions are fed into the model to be classified as being in need of intervention. In particular, for example, routine transactions or transactions associated with recent contacts with OCA, are filtered as part of predefined model parameters. If someone has had recent contact with the OCA, the model will not recommend additional contact. The presumption is that the OCA is working to remedy the problem, despite possible ongoing customer action.

In step 140, customer service transactions with accompanying household data sets that are deemed to be most similar to those which precipitated OCA interactions in the past are flagged for proactive intervention. In some embodiments, transactions with accompanying household data sets that are deemed to be most similar to those which precipitated OCA interactions are ranked based on their mathematical similarity to characteristics of those who have previously reached the OCA and only the top ranked transactions are flagged for proactive intervention.

In an exemplary embodiment, the model is deployed on an R-server (simultaneously running R versions 2.15 and 3.0) which runs on Red Hat Linux (version 6.5). Daily data is pushed to the model via SPSS Modeler (version 16.0).

Figure 2:
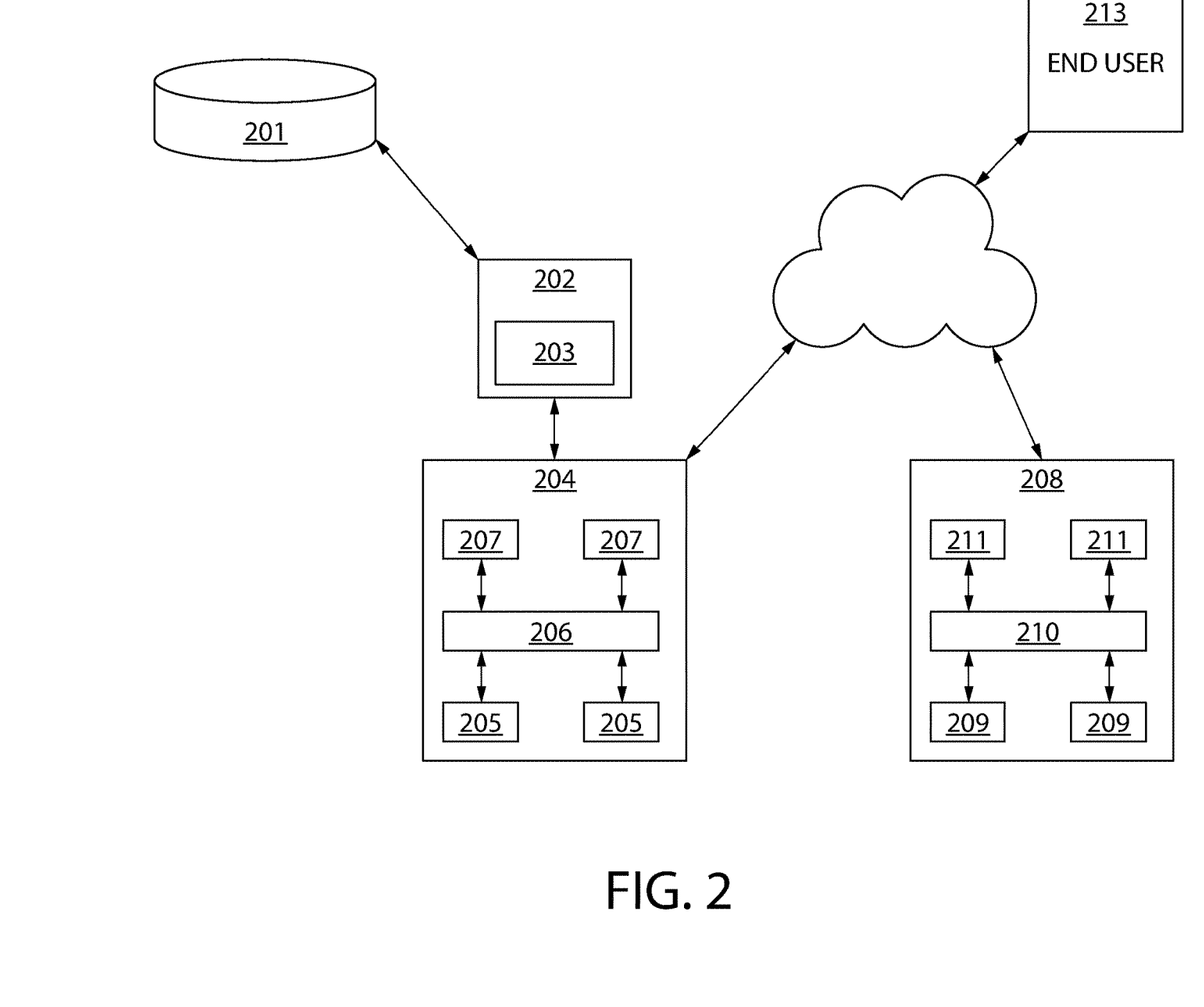
FIGS. 2 and 3 illustrate exemplary systems that may be used to carry out the methods of the present invention.
Figure 3:
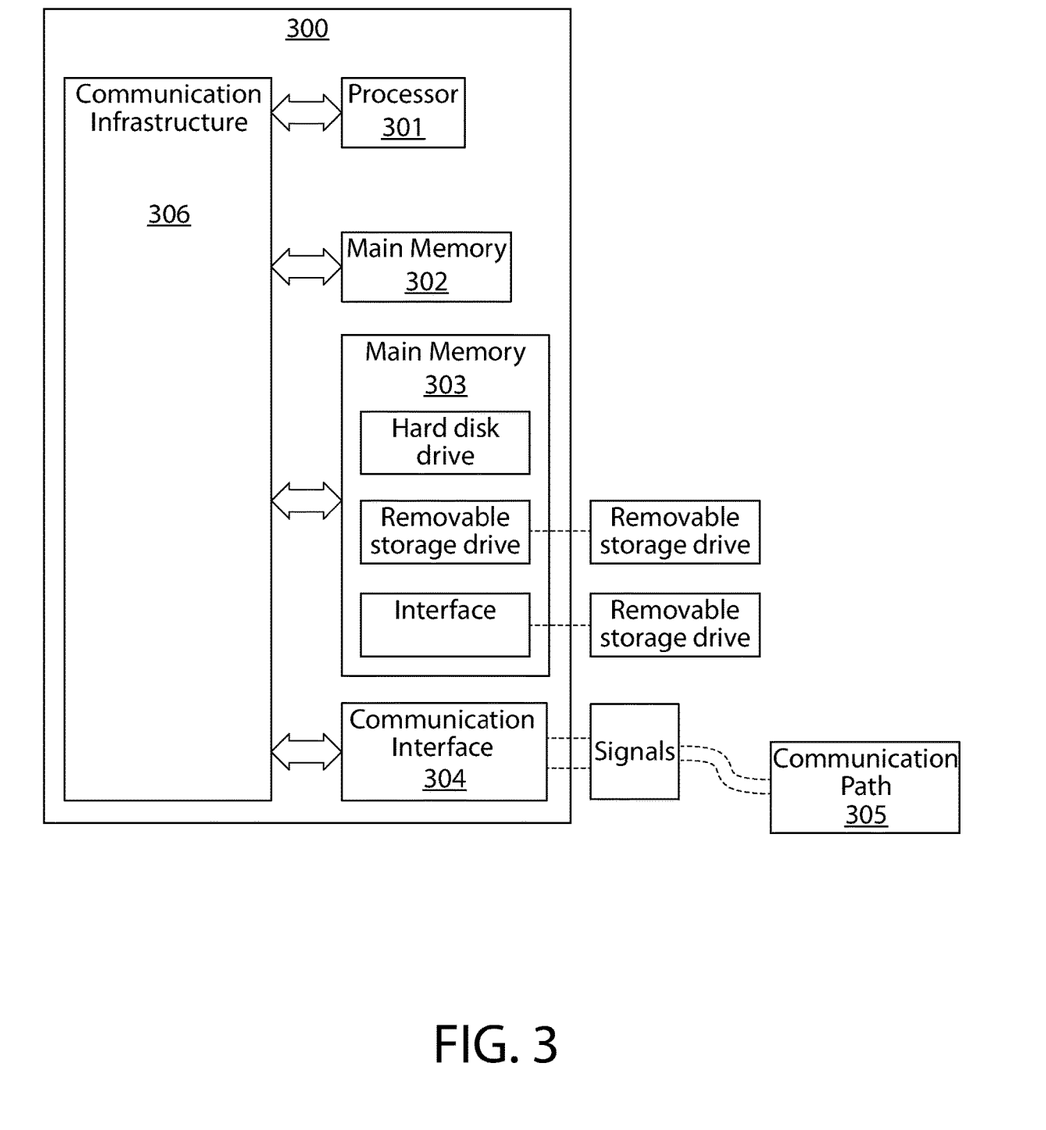

Exemplary computer systems, including computer hardware and software, that may be used to implement the methods of the present invention are now described with reference to FIGS. 2 and 3. The calculations performed in connection with the invention are performed by executing a computer software application using a computer processor. The inputs for the calculations can be received through human input into an appropriate computer interface. Alternatively, in some embodiments, the inputs may be received from another computer system.

In some embodiments, the methods are carried out by a system that employs a client/server architecture. Such exemplary embodiments are described as follows with reference to FIG. 2. The data that may be used as an input to the system, and the outputs to the system, may be stored in one or more databases 201. Database server(s) 202 may include a database services management application 203 that manages storage and retrieval of data from the database(s) 201. The databases 201 may be relational databases; however, other data organizational structure may be used without departing from the scope of the present invention.

One or more application server(s) 204 are in communication with the database server 202. The application server 204 communicates requests for data to the database server 202. The database server 202 retrieves the requested data. The application server 204 may also send data to the database server 202 for storage in the database(s) 201. The application server 204 comprises one or more processors 205, non-transitory computer readable storage media 207 that store programs (computer readable instructions) for execution by the processor(s) (e.g., to perform the calculations described herein), and an interface 206 between the processor(s) 205 and computer readable storage media 207. The application server 204 may store the computer programs referred to herein, as described more fully herein.

To the extent data and information is communicated over the Internet or an Intranet, one or more Internet/Intranet servers 208 may be employed. The Internet/Intranet server 208 also comprises one or more processors 209, computer readable storage media 211 that store programs (computer readable instructions) for execution by the processor(s), and an interface 210 between the processor(s) 209 and computer readable storage media 211. The Internet/Intranet server 208 is employed to deliver content that can be accessed through the communications network 212, e.g., by an end user employing computing device 213. When data is requested through an application, such as an Internet browser, the Internet/Intranet server 208 receives and processes the request. The Internet/Intranet server 208 sends the data or application requested along with user interface instructions for displaying a user interface on device 213.

The computers referenced herein are specially programmed to perform the functionality described herein.

The non-transitory computer readable storage media (e.g., 207 or 211) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

Computer system 300 comprises hardware, including a computer processor, as described more fully herein, that is specifically programmed using code (i.e., computer readable instructions stored in a non-transitory computer readable medium) to carry out the steps of the methods and calculations described herein.

Computer system 300 includes one or more processors 301. Processor 301 may be any type of processor, including but not limited to a special purpose or general purpose digital signal processor. Processor 301 may be connected to a communication infrastructure 306 (for example, a bus or network).

Computer system 300 also includes one or more memories 302, 303. Memory 302 may be random access memory (RAM). Memory 303 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 303 may include other similar means for allowing computer programs or other instructions to be loaded into computer system 300. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 300. Alternatively, the program may be executed and/or the data accessed from the removable storage unit, using the processor 301 of the computer system 300.

Computer system 301 may also include a communication interface 304. Communication interface 304 allows software and data to be transferred between computer system 300 and external devices. Examples of communication interface 304 may include a modem, a network interface (such as an Ethernet card), and a communication port, by way of example. Software and data transferred via communication interface 304 are in the form of signals, which may be electronic, electromagnetic, optical, or other signals capable of being received by communication interface 304. These signals are provided to communication interface 304 via a communication path 305. Communication path 305 carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 300. However, these terms may also include signals (such as electrical, optical or electromagnetic signals) that embody the computer program disclosed herein.

Computer programs are stored in memory 302 and/or memory 303. Computer programs may also be received via communication interface 304. Such computer programs, when executed, enable computer system 300 to implement the present invention as discussed herein. Accordingly, such computer programs represent controllers of computer system 300. Where the invention is implemented using software, the software may be stored in a computer program product and loaded into computer system 300 using removable storage drive, hard disk drive, or communication interface 304, to provide some examples.

It is necessary to carry out the methods of the present invention using a computer. More particularly, the model simultaneously considers over 2000 variables for each individual who contacts customer service to determine if such individual should be referred to OCA. More particularly, the predictive model assesses the relative similarity between a novel individual and the characteristics of individuals who have behaved in a particular way (e.g., sought resolution for a problem) and experienced a particular outcome (e.g., non-resolution of their problem and escalation to OCA). An individual's likelihood to engage in an activity and experience a particular outcome is determined by considering the relationship between behaviors and outcomes over a period spanning multiple months with the aggregate data relating to parameters simultaneously existing in more than 2000 dimensions for each of many thousands of individuals. Such processing could only be carried out by a computer.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer implemented method for predicting early customer service intervention candidates, the method comprising:

receiving household data for households that are associated with a customer service interaction of an organization, which is received at a first customer service computer terminal associated with a first customer service level, as of a certain date, the household data being created over a first pre-determined period of time preceding the certain date and being stored in a database, wherein the first customer service computer terminal is coupled to the database;

isolating from the household data, specific customer service interactions related to the household data based on one or more of i) prior communications and ii) trigger mechanisms, to produce an isolated set of household data;

training a support vector machine model using machine learning, the training including:

identifying from the isolated set of household data, using the support vector machine model, positive household data sets relating to customer service interactions, which preceded a high level customer service interaction within a predetermined subsequent period of time, and negative household data sets relating to customer service interactions, which did not precede a high level customer service interaction within the predetermined subsequent period of time, wherein the identification of the positive household data sets and negative household data sets are based on identifying patterns in customer characteristics, qualitative characteristics obtained from unstructured data, and quantitative characteristics obtained from structured data, wherein the identification includes uncovering patterns in case data, text analysis of unstructured data from call logs associated with at least one of an emotional state of a customer, customer behavior, word count, and word usage;

receiving, from the database, historical transactional data of the customer service interactions associated with the positive household data sets, the historical transactional data including data associated with transactions between the organization and households associated with the positive household data sets; and processing, using the support vector machine model, the positive household data sets and the negative household data sets to determine differences between data contained within the positive household data sets and the negative household data sets based on at least the historical transactional data;

collecting on a daily basis daily household data describing individual customer service interactions occurring during a previous calendar day;

removing daily household data that include households receiving an elevated interaction from the organization based on a time period occurring in proximity to when the removing occurred to generate filtered daily household data;

processing the filtered daily household data, using the support vector machine model, to determine whether each individual customer service interaction occurring during the previous calendar day is more similar to the positive household data sets or to the negative household data sets;

flagging, using the support vector machine model, the individual customer service interactions that are more similar to the positive household data sets based on at least the identified patterns in the customer characteristics;

identifying, using the support vector machine model, elevated customer service level customer candidates for early intervention based upon the flagged individual customer service interactions, wherein the elevated customer service level is different from the first customer service level;

displaying data associated with the identified elevated customer service level customer candidates on a user interface to notify an end user that early intervention within a predetermined intervention time period is required;

receiving an indication that early intervention has occurred and resulted in retention;

receiving early intervention feedback data in response to the indication that the early intervention has occurred and resulted in retention;

displaying on the user interface, an interaction element associated with the early intervention feedback data that allows the end user to interact with the early intervention feedback data; and recording, using the support vector machine model, the early intervention feedback data and refining the support vector machine model based on the recorded early intervention feedback data.

2. The method of claim 1, wherein the differences are based on predetermined weights assigned to each individual customer service interaction of the positive household data sets and the negative household data sets.

3. The method of claim 1, wherein the unstructured data comprises textual data from log notes of customer service representatives.

4. The method of claim 1, further comprising: displaying the flagged individual customer service interactions, wherein upon displaying the flagged individual customer service interactions, an end user is able to interact with the flagged individual customer service interactions.

5. The method of claim 1 further comprising:

isolating from the individual customer service interactions a subset including individual customer service interactions that have not preceded the high level customer service interaction within a predetermined amount of time.

6. A system comprising:

a memory operable to store at least one program; and a processor communicatively coupled to the memory, the processor including a support vector machine model, in which the program, when executed by the processor, causes the processor to perform a method for predicting early customer service intervention candidates, the method comprising:

receiving household data for households that are associated with a customer service interaction of an organization, which is received at a first customer service computer terminal associated with a first customer service level, as of a certain date, the household data being created over a first pre-determined period of time preceding the certain date and being stored in a database, wherein the first customer service computer terminal is coupled to the database;

isolating from the household data specific customer service interactions related to the household data based on one or more of i) prior communications and ii) trigger mechanisms, to produce an isolated set of household data;

training the support vector machine model using machine learning, the training including:
  identifying from the isolated set of household data, using the support vector machine model, positive household data sets relating to customer service interactions, which preceded a high level customer service interaction within a predetermined subsequent period of time, and negative household data sets relating to customer service interactions, which did not precede a high level customer service interaction within the predetermined subsequent period of time,
  wherein the identification of the positive household data sets and negative household data sets are based on identifying patterns in customer characteristics, qualitative characteristics obtained from unstructured data, and quantitative characteristics obtained from structured data, wherein the identification includes uncovering patterns in case data, text analysis of unstructured data from call logs associated with at least one of an emotional state of a customer, customer behavior, word count, and word usage;
  receiving, from the database, historical transactional data of the customer service interactions associated with the positive household data sets, the historical transactional data including data associated with transactions between the organization and households associated with the positive household data sets; and
  processing, using the support vector machine model, the positive household data sets and the negative household data sets to determine differences between data contained within the positive household data sets and the negative household data sets based on at least the historical transactional data;
collecting on a daily basis daily household data describing individual customer service interactions occurring during a previous calendar day;
removing daily household data that include households receiving an elevated interaction from the organization based on a time period occurring in proximity to when the removing occurred to generate filtered daily household data;
processing the filtered daily household data, using the support vector machine model, to determine whether each individual customer service interaction occurring during the previous calendar day is more similar to the positive household data sets or to the negative household data sets;
flagging, using the support vector machine model, the individual customer service interactions that are more similar to the positive household data sets based on at least the identified patterns in the customer characteristics;
identifying, using the support vector machine model, elevated customer service level customer candidates for early intervention based upon the flagged individual customer service interactions, wherein the elevated customer service level is different from the first customer service level;
displaying data associated with the identified elevated customer service level customer candidates on a user interface to notify an end user that early intervention within a predetermined intervention time period is required;
receiving an indication that early intervention has occurred and resulted in retention;
receiving early intervention feedback data in response to the indication that the early intervention has occurred and resulted in retention;
displaying on the user interface, an interaction element associated with the early intervention feedback data that allows the end user to interact with the early intervention feedback data; and
recording, using the support vector machine model, the early intervention feedback data and refining the support vector machine model based on the recorded early intervention feedback data.

7. A non-transitory computer readable medium storing instructions which, when executed by a computer processor, including a trained support vector machine model, cause the computer processor to perform a method for predicting early customer service intervention candidates, the method comprising:
  receiving household data for households that are associated with a customer service interaction of an organization, which is received at a first customer service computer terminal associated with a first customer service level, as of a certain date, the household data being created over a first pre-determined period of time preceding the certain date and being stored in a database, wherein the first customer service computer terminal is coupled to the database;
  isolating from the household data, specific customer service interactions related to the household data based on one or more of i) prior communications and ii) trigger mechanisms, to produce an isolated set of household data;
  training a support vector machine model using machine learning, the training including:
    identifying from the isolated set of household data, using the support vector machine model, positive household data sets relating to customer service interactions, which preceded a high level customer service interaction within a predetermined subsequent period of time, and negative household data sets relating to customer service interactions, which did not precede a high level customer service interaction within the predetermined subsequent period of time,
    wherein the identification of the positive household data sets and negative household data sets are based on identifying patterns in customer characteristics, qualitative characteristics obtained from unstructured data, and quantitative characteristics obtained from structured data, wherein the identification includes uncovering patterns in case data, text analysis of unstructured data from call logs associated with at least one of an emotional state of a customer, customer behavior, word count, and word usage;
    receiving, from the database, historical transactional data of the customer service interactions associated with the positive household data sets, the historical transactional data including data associated with transactions between the organization and households associated with the positive household data sets; and
    processing, using the support vector machine model, the positive household data sets and the negative household data sets to determine differences between data contained within the positive household data sets and the negative household data sets based on at least the historical transactional data;

collecting on a daily basis daily household data describing individual customer service interactions occurring during a previous calendar day;

removing daily household data that include households receiving an elevated interaction from the organization based on a time period occurring in proximity to when the removing occurred to generate filtered daily household data;

processing the filtered daily household data, using the support vector machine model, to determine whether each individual customer service interaction occurring during the previous calendar day is more similar to the positive household data sets or to the negative household data sets;

flagging, using the support vector machine model, the individual customer service interactions that are more similar to the positive household data sets based on at least the identified patterns in the customer characteristics;

identifying, using the support vector machine model, elevated customer service level customer candidates for early intervention based upon the flagged individual customer service interactions, wherein the elevated customer service level is different from the first customer service level;

displaying data associated with the identified elevated customer service level customer candidates on a user interface to notify an end user that early intervention within a predetermined intervention time period is required;

receiving an indication that early intervention has occurred and resulted in retention;

receiving early intervention feedback data in response to the indication that the early intervention has occurred and resulted in retention;

displaying on the user interface, an interaction element associated with the early intervention feedback data that allows the end user to interact with the early intervention feedback data; and recording, using the support vector machine model, the early intervention feedback data and refining the support vector machine model based on the recorded early intervention feedback data.

* * * * *